United States Patent [19]

Byrns

[11] Patent Number: 4,889,075

[45] Date of Patent: Dec. 26, 1989

[54] DUCK HOUSE

[76] Inventor: James E. Byrns, 1027 2nd Ave., South Clinton, Iowa 52732

[21] Appl. No.: 241,175

[22] Filed: Sep. 7, 1988

[51] Int. Cl.$^4$ ............................................. A01K 31/00
[52] U.S. Cl. ....................................................... 119/23
[58] Field of Search ................................. 119/23, 45.1

[56] References Cited

U.S. PATENT DOCUMENTS

| 3,177,849 | 4/1965 | Isenberg | 119/23 |
| 3,205,858 | 9/1965 | Chadek | 119/23 |
| 3,916,836 | 11/1975 | Justl | 119/23 |
| 4,140,081 | 2/1979 | Killmon | 119/23 |
| 4,239,021 | 12/1980 | Moore | 119/23 |
| 4,768,466 | 9/1988 | Burns et al. | 119/23 |

FOREIGN PATENT DOCUMENTS 389588  2/1924  Fed. Rep. of Germany ......... 119/23

Primary Examiner—Paul J. Hirsch
Attorney, Agent, or Firm—Thomas J. Greer, Jr.

[57] ABSTRACT

A duck house for Wood Ducks is formed of two double walled, half cylindrical sections and a double wall bowl. Each cylindrical half section carries hinge elements on its sides to enable the front section to be opened about either side edge thereof for inspection and cleaning. The other or rear section is readily attached to either a wooden post, a tree, a barn, or a metal post. Each section is formed of plastics by conventional blow molding equipment and exhibits thermal insulation properties to produce slower changes in interior temperature than changes in ambient temperature. The shape and dimensions of the house are such as to display resistance to predators. The interior of the front section is provided with steps to permit duckling egress from the house.

8 Claims, 4 Drawing Sheets

DUCK HOUSE

BACKGROUND OF THE INVENTION

This invention relates to a bird shelter and more particularly to a Wood Duck nest house.

This art is aware of a variety of bird houses, however such constructions have not proven suitable for large birds, and more particularly the North American Wood Duck, sometimes known as the Tree Duck. Commercial hunting for their plummage, as well as sports hunting for their meat, combined with loss of habitat, have substantially reduced the numbers of these birds, and nearly eliminated this species in some areas of North America, particularly the United States. Its natural nesting site is in the cavities of trees. Since the late 1930's, duck houses of various shapes, sizes and materials have been used in an attempt to increase the number of this species. Such attempts have met a variable degree of success, depending upon the attractiveness to the female seeking a nest site, as Well as predator proofness, duckling escape provisions, durability, cost, site selection, and thermal insulation properties.

Previous duck houses for this particular species of duck have included home made versions, fashioned from wood or metal, generally about two to two and one-half feet long with an elliptical opening in the top in the range of three to four inches major diameter dimension.

Other past constructions are included the Tubbs house, which is rotationally molded and which has a single wall fashioned from plastic. This construction includes a hardware cloth escape ladder with top and bottom halves which are screwed together. This construction has been found somewhat difficult to clean, difficult to mount and rather expensive.

Still other past constructions have included a two piece unit for mounting on pipes only. This has been marketed by Waterfowl Limited of South Carolina, and is also characterized as a single wall and hardware cloth escape ladder construction.

SUMMARY OF THE INVENTION

According to the practice of this invention, a duck house is formed of blow-molded, double wall construction having two hinged sections. The construction is such as to present a minimum of attractiveness to predators, and to exhibit a maximum of convenience to a female duck and her ducklings. The duck house of this invention is relatively inexpensive to manufacture by conventional blow molding equipment and displays significant resistance to mechanical shocks. The duck house of this invention further exhibits a variety of mounting modes to thereby enable it to be mounted on a wooden post, a tree, a metal pipe or a barn. By virtue of a double wall thickness construction, the thermal insulation properties of the duck house are superior to those of many prior constructions. The double wall construction inhibits mechanical failure or cracking of the duck house when it is mounted. By virtue of a vertical division of the duck house into two independently hinged sections, each of whose hinge pins can be removed, full access to interior of the duck house can be obtained by pivoting in either of two desired directions. The construction permits inspection by game wardens or researchers without the use of special hand tools, such as screwdrivers or pliers.

DETAILED DESCRIPTION OF THE INVENTION

Figure 1:
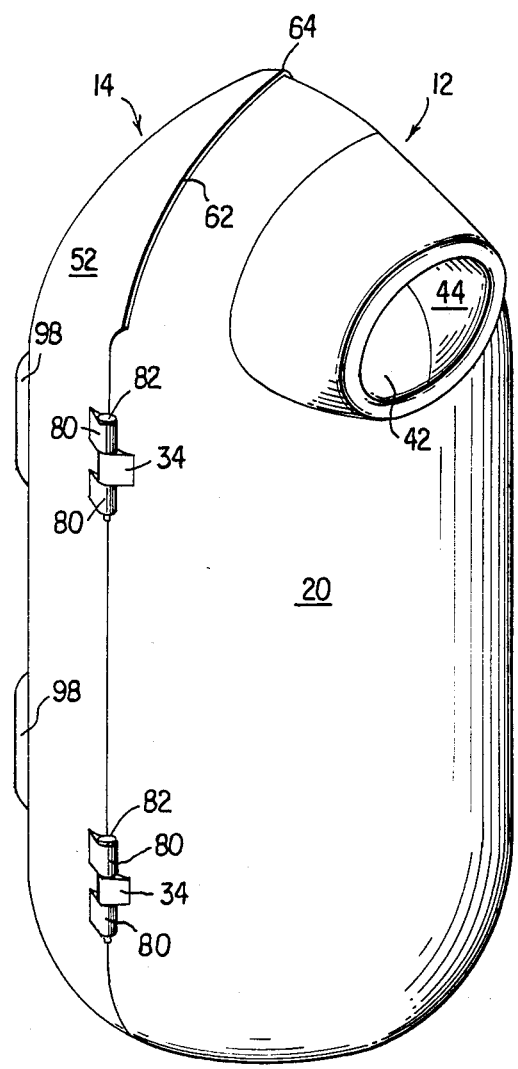
FIG. 1 is a perspective view of the duck house of this invention.
Figure 2:
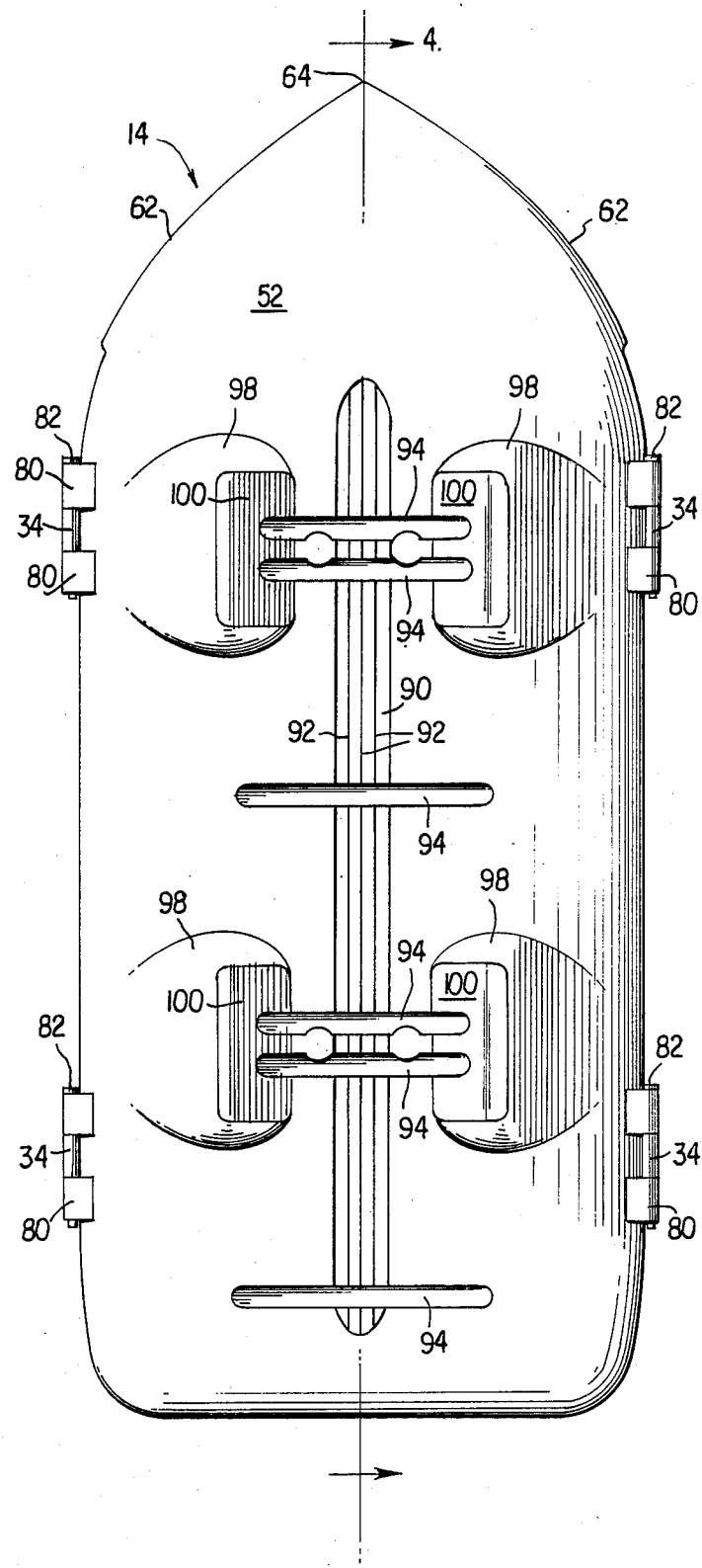
FIG. 2 is a rear elevational view of the duck house of FIG. 1.

Referring now to the drawings, FIG. 1 illustrates the duck house of this invention, and is comprised of two similar, generally semi cylindrical sections 12 and 14. Each section is formed by blow molding a single preform, by known blow molding techniques and apparatus and is provided with hinge pin receiving elements (later to be described) at each vertical side edge, and is of double wall thickness. Considering firstly front section 12, the numeral 20 denotes its outer wall while the numeral 22 denotes its inner wall. The inner wall is provided with a plurality of outwardly extending weldments 26 which integrally joining the two walls (as do all the other weldments) to rigidify the lower portion of section 12. The numeral 28 denotes an integral set of saw tooth like steps molded on inner wall 22, these backward sloping steps functioning as a ladder for ducklings to climb from the bottom of the duck house to entrance opening 42.

For a water repellency first or inner rim 30 extends completely around the edge or major opening of section 12, and terminates in a second or outer rim 32. Rims 30 and 32 integrally connect walls 20 and 22. The numeral 34 denotes any one of four apertured hinge elements integrally formed with section 12.

An elliptical or oval opening, denoted by the numeral 42, provides entry to and exit from the interior of the duck house, the interior portions of this opening denoted by the numerals 44 (upper) and 46 (lower) and defining an annularly continuous flange extending into the house.

Bulges 38 extend inwardly from flange 30 towards the interior of section 12 and are integrally formed with inner wall 22.

The rear section 14 is also of blow-molded double wall construction, the outer wall denoted by the numeral 52 and the inner wall denoted by the numeral 54. An inner rim 56 extends around the edge or major opening of section 14, with integral bulges 58 positioned on inner wall 54 at locations corresponding to those of abutments 38 of section 12. Bulges 58 are spaced inwardly from rim 56 as are bulges 57. Bulges 38, 57, 58 are residual air pocket zones resulting from the blow molding needles during the molding process and play no role in the operation of the duck house. A second and outer rim 60 also surrounds the major opening of section 14, with skirt 62 extending across the major length of the upper portion of section 12, and projecting away from its interior. The uppermost portion of section 14 has a tip 64, which is intended to be relatively sharp to thus inhibit predators from perching on the duck house.

Referring now to the central, inner portion of section 14, the numeral 64 denotes an inwardingly extending rectangular bulge or projection, with a second horizontally running bulge or projection, vertically spaced from the first, denoted by the numeral 66. The numeral 68 denotes either of two vertically extending ridges or inwardly extending projections. These four vertically and horizontal extending projections defining, in general, a flattened area 70 having interruptions, now to be described. The numeral 72 denote any one of four weldments or dimples which are adapted pairwise to receive a respective U-bolt, later to be described. The ends of an upper U-bolt are adapted to fit into the uppermost pair of dimples 72, while the ends of a lower U-bolt are adapted to be received in the lowermost pair 72. The numeral 74 denotes any one of five dimples or hollow weldments. This latter group of weldments is arranged to form an upper pair, a lower pair and an intermediate one. Weldments 74 are each adapted to receive mounting nails, as will later be described. The numeral 76 denotes any one of vertically spaced lag screw dimples, or weldments, the openings of which extend toward the viewer in FIG. 3, as do the other weldments.

The numeral 78 denotes either one of two vertically spaced interior channels extending between horizontally spaced ridges 68.

Figure 5:
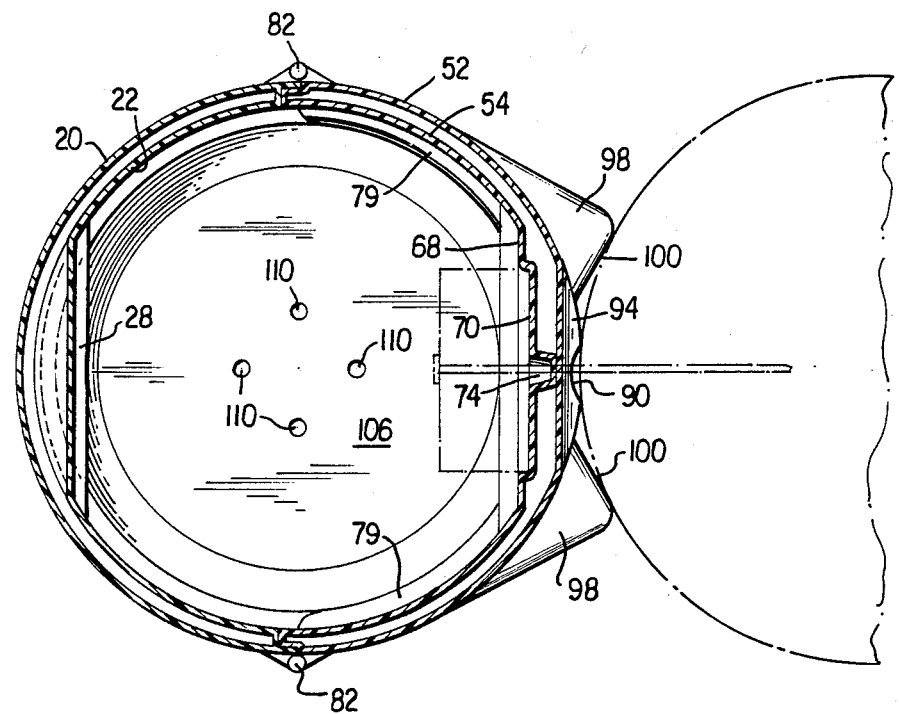
FIG. 5 is a view taken along section 5—5 of FIG. 4.
Figure 6:
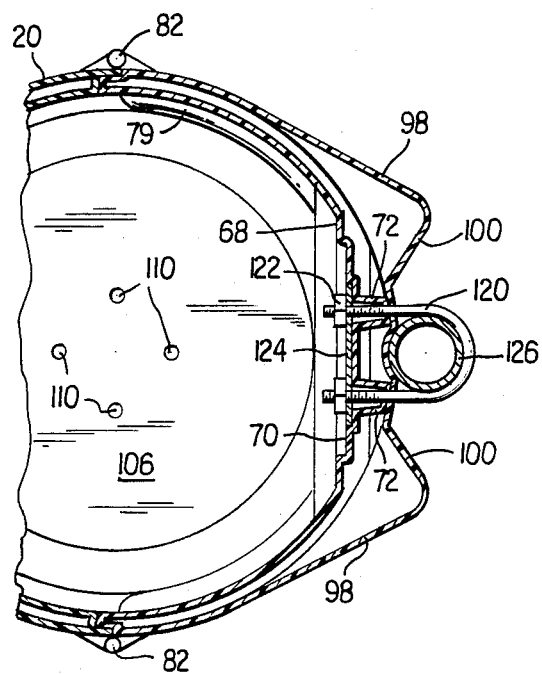
FIG. 6 is a view taken along section 6—6 of FIG. 4.

The numeral 79 denotes either of two inwardly extending bowl latching ledge sectors, semi cylindrical in transverse cross section, located approximately the same vertical height from the bottom of section 14 as the lower portion of bulge 64. The angular extent of ledge sectors 79 is seen at FIGS. 5 & 6.

The exterior wall 52 of section 14 is provided with a central, longitudinally extending and arcuate channel 90, optionally including elongated ribs 92, the latter raised outwardly of the section. Four spaced channels 14 orthogonally intersect channel 90.

The numeral 80 denotes any one of eight integral, hinge pin receiving elements, arranged in pairs, receiving corresponding or mating hinge elements 34 of section 12.

A hinge pin 82, manually insertable and manually removable, extends through each of the four hinges thereby permitting either side of front section 12 of the duck house to be opened about the remaining pair of hinges on mounted, rear section 14. Hinge elements 34, 80 are located on the respective vertically extending side edges of front 12 and rear 14 sections.

The numeral 98 denotes any one of four mounting feet on the outer surface 52 of section 14, each having a post engaging surface 100.

Figure 3:
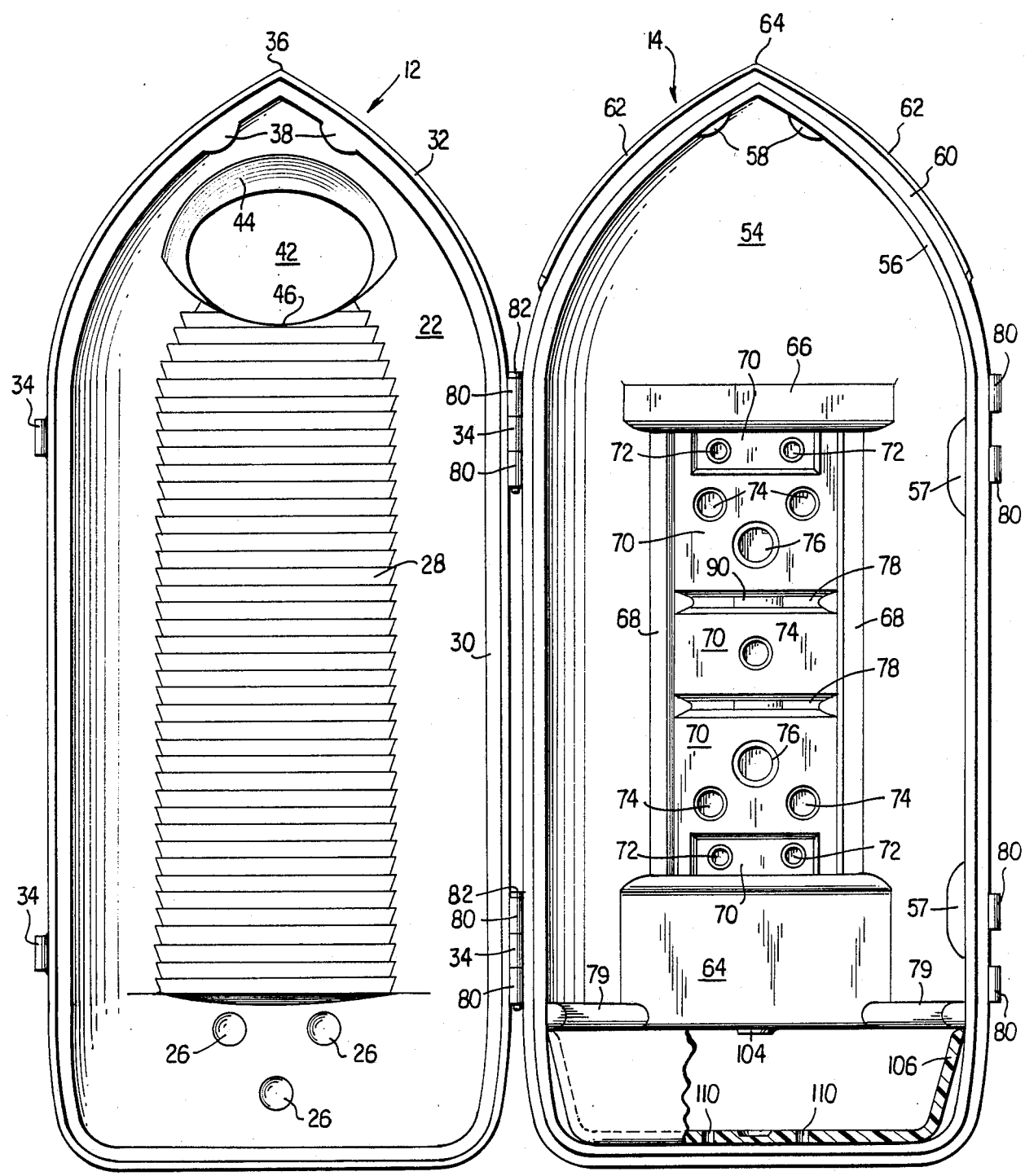
FIG. 3 is a view showing the interior of the duck house when the two sections are swung apart 180 degrees about one set of hinges.
Figure 4:
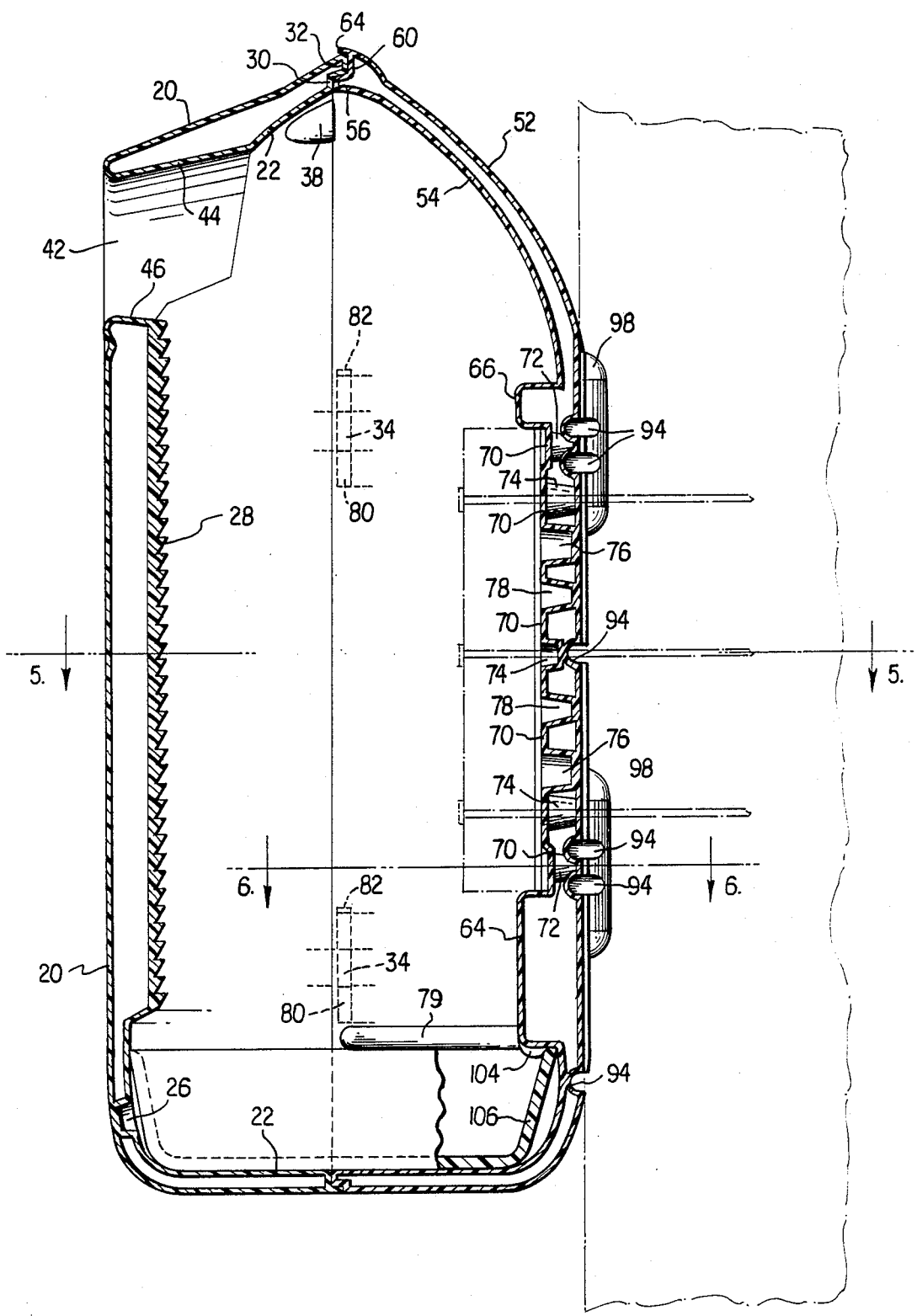
FIG. 4 is a view taken along section 4—4 of FIG. 2.

Referring now to the lower portion of the duck house, as shown at FIGS. 3 and 4, the numeral 104 denotes a downwardly extending dimple on the lower portion of bulge 64, this dimple adapted to effect a snap engagement with a portion of the inner-periphery of a removable plastic dish 106. This dish may also be of double wall, blow molded construction. It has several through drainage openings 110 at its bottom. Both the latching dimple and the latching ledge sectors 79 releasably hold the dish in place in rear section 14.

When the house is fully closed, skirt 62 of section 14 overlies outer rim 32 of section 12, as seen at FIG. 4, to inhibit rain entrance into the house. It also inhibits raccoons from attempting to open the house by paw insertion between rims 32 and 60. The mating abutment of rims 56 of section 14 and 30 of section 12 at the lowermost portion of the house is not completely watertight, to thereby permit rainwater to drain from the bottom.

The several modes of mounting stationary section 14 of the duck house are as follows. Preferably, the rear section is mounted while unattached to the front section. In the event that the duck house is to be mounted by nailing it to a tree or wooden post or barn, five nails are driven through a block of wood, both shown in phantom lines at FIG. 4, the block snugly fitting into the rectangular space defined by elements 64, 66 and 68, as shown at FIGS. 3 and 4. The pattern of the nails, also shown in phantom lines at FIG. 4, is defined by the location of dimples 74. As indicated most clearly at FIG. 5, abutment surfaces 100 define four post or tree engaging surfaces to firmly stabilize the duck house. The feet 98 stabilize the duck house when mounted on the flat surface of a barn. The house must be stable, otherwise the hen will not remain in it.

In the event that an iron post is employed to mount section 14 of the duck house, the mode indicated at FIG. 6 is employed. There, the numeral 120 denotes the lowermost of two U-bolts whose threaded ends are engaged by nuts 122, the latter bearing against a small metal plate 124, which plate in turn bears against an inner wall portion of section 14. U-bolt 120 fits around a vertically extending pipe denoted by the numeral 126. Each of the upper and lower pairs 72 of weldment dimples receives its own U-bolt 120. If two duck houses are mounted back to back on a pipe or other metal post 126, the corresponding feet 98 of each will abut to further enhance stability against wind forces. The ribs 92 (not shown in FIG. 6) in groove 90 enhance friction against the pipe and thus increase stability. Grooves 94 of section 14 accomodate the bights of the U-bolts of other houses which may be mounted on the same pipe. The closed ends of weldments 72 must first be punched through to enable insertion of the U-bolts.

While not illustrated, the reader will readily visualize that lag screws, one each in a respective dimple 76, may be employed instead of nails and U-bolts. Lag screws may also be used in combination with a wood block.

In practice, each of the of mounting dimples 72, 74, 76 is correspondingly marked as U-BOLT, NAIL, LAG SCREW by molded raised indicia to designate its function and thus facilitate installation.

In operation, after the duck house has been mounted above ground and selected by a female duck, she passes through elliptical opening 42, and gains entry to the interior of the duck house to lay her eggs. After hatching of the eggs, and after a suitable length of time, the ducklings are able to temporarily leave the nest, from time to time, by climbing up the steps defined by teeth 28.

The dimensions of oval entrance opening 42 are critical and are about 3 measured vertically by 4 measured horizontally inches. This makes the entrance just large enough for the female duck to pass through, but is to small for adolescent raccoons to enter. The dimension from the bottom of the entrance at portion 46 to the top of the bowl 106 is critical and is of a minimum of 15 inches. This length places the top of the nest bowl out of the reach of the paw of a mature raccoon's arm. The interior diameter of the housing is about 9.5 inches which provides ample space for the hen and the ducklings The material of construction is typically polyethylene and is given a neutral color such as light tan. The exterior surfaces of walls 20, 52 are textured as in the manner of shallow depth wood grain to more readily blend in the landscape and avoid a reflective shine. The space between the inner and outer walls is about 0.5 inch.

The double wall construction of bowl 106 provides thermal insulation for eggs, the bowl initially filled with 2.5 to 3.0 inches of wood shavings and sawdust. Bowl openings 110 permit drainage so that a torrential rain blowing into entrance 42 can pass through the sawdust and out through the seam at the duck house bottom and thus prevent filling of the bowl and of the duck house.

An important aspect of the invention is the molded saw tooth escape ladder 28. Some earlier duck houses were virtually death traps for ducklings if an easy escape was not provided. A strip of wire mesh hardware cloth has been the most common means of duckling means of escape. However the sharp edges would sometimes tear or cut the hen in her repeated comings and goings. If not carefully and securely attached at both top and bottom, the ducklings would sometimes become entrapped under the wire in their climbing to the house top and out the entrance. By molding the ladder in place, there is no chance of insecure mounting or fastening of the ladder.

It is to be noted that by virtue of the several weldments 72, 74, 76, an internal wooden mounting block is not actually needed. The weldments so rigidify the mounting zone in the region of surfaces 70 that nails or lag screws alone may be used for mounting.

The use of nails to mount the house is used for those wooden supports wherein the mounting is to be permanent. The lag screw mode of mounting is employed by persons undecided about the best location for the house and who may wish to relocate if the ducks are not initially interested. The pipe mounting mode is employed for locations in the middle of a pond or marsh. This mounting may be used by game biologists who can easily check and service a number of houses by boat rather than by carrying a ladder through the woods.

I claim:

1. A duck house of generally cylindrical form and adapted to be vertically mounted on an independent, stationary support, the house comprised of two vertically extending and generally semi cylindrical sections each of integral, spaced apart double walled, blow molded construction, one section being a front and the other a rear section, the side edges of each section carrying means for releasably and independently hingedly connecting said side edges together to thereby permit the front section to hinge about either side edge of the rear section, the upper portion of the front section provided with an oval entrance opening, an integrally formed set of saw teeth like horizontal steps vertically running along and down the interior wall of the front section for a distance of at least fifteen inches and whose steps commence contiguous to the lower portion of said oval opening, the rear section provided with means to mount it on an independent stationary support, said mounting means defined by a plurality of weldments integrally connecting the inner and outer walls of the rear section and having fastener receiving hollow openings on the inner wall of the rear section, whereby the rear section can be mounted on a support in any one of a plurality of fastener modes.

2. The duck house of claim 1 including a nest bowl removably positioned at the bottom of the house, said bowl having at least one rain drainage opening in the bottom wall thereof, the juncture of the two sections at the bottom of the house not being watertight so that rain entering the house from the oval entrance can drain through the bowl and out of the house.

3. The house of claim 1 wherein the tops of the sections are pointed to thereby inhibit predators from perching on it.

4. The duck house of claim 1 wherein one of said sections carries at its upper rim portion a horizontally extending skirt overlying the upper rim portion of the other section to inhibit the entrance of rain water into the house through the upper junction of the two sections.

5. The duck house of claim 1 wherein the outer wall of the rear section is provided with a plurality of outwardly extending integral feet., the feet adapted to bear against a support to rigidify the mounting of the house on either a tree or a flat surface.

6. The duck house of claim 1 wherein the outer wall of the rear section is provided with a vertically extending pipe mounting groove to thereby assist in mounting the house on a vertically extending pipe, and wherein at least two of said plurality of rear section mounting weldments are located so that each of said two weldments is located on a respective opposite side of said pipe mounting groove.

7. The duck house of claim 1 wherein said oval entrance opening carries an internally extending, annularly continuous flange which extends into the house interior.

8. The duck house of claim 2 wherein said bowl is of double walled, blow molded construction and wherein a latching dimple and latching ledge sectors on the rear section hold the bowl in place in the bottom of the rear section when the front section is opened for inspection.

* * * * *